United States Patent
Li et al.

(10) Patent No.: US 9,977,133 B2
(45) Date of Patent: May 22, 2018

(54) RADIO ACCESS NETWORK SERVICE-ASSISTED, SENSOR BASED INDOOR NAVIGATION

(71) Applicant: Verizon Patent and Licensing Inc., Arlington, VA (US)

(72) Inventors: Yuk Lun Li, Morganville, NJ (US); Xin Ren, Edison, NJ (US); Zheng Zhao, Plainsboro, NJ (US); Nanjun Qian, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 800 days.

(21) Appl. No.: 14/468,683

(22) Filed: Aug. 26, 2014

(65) Prior Publication Data
US 2016/0061957 A1    Mar. 3, 2016

(51) Int. Cl.
*G01S 19/47* (2010.01)
*H04W 4/02* (2018.01)
*G01S 5/02* (2010.01)

(52) U.S. Cl.
CPC ............ *G01S 19/47* (2013.01); *G01S 5/0263* (2013.01); *H04W 4/02* (2013.01)

(58) Field of Classification Search
CPC ................................. H04W 4/02; G01S 19/47
USPC ........................ 342/357.42, 357.31
See application file for complete search history.

(56) References Cited

U.S. PATENT DOCUMENTS

2011/0117924 A1* 5/2011 Brunner ............... G01S 5/0252
455/456.1

OTHER PUBLICATIONS

Stéphane Beauregard et al., "Pedestrian Dead Reckoning: A Basis for Personal Positioning", Proceedings of the 3rd Workshop on Positioning, Navigation and Communication 2006 (WPNC 2006), pp. 27-36, Hannover, Germany.
Qualcomm Inc., Discussion on E911 Indoor Location Accuracy, San Diego, CA, Nov. 18, 2013.
LTE; Evolved Universal Terrestrial Radio Access (E-UTRA); Requirements for support of radio resource management, Section 8.1.2.5 (3GPP TS 36.133 version 11.8.0 Release 11) ETSI TS 136 133 V 11.8.0 (Apr. 2014) [on-line], [retrieved on Jul. 22, 2014] retrieved from the Internet <URL: (http://www.etsi.org/deliver/etsi_ts/136100_136199/136133/11.08.00_60/)>.

* cited by examiner

*Primary Examiner* — Gregory C. Issing
*Assistant Examiner* — Helena H Seraydaryan

(57) ABSTRACT

Examples are provided that enable a cellular network location assist to confirm a position determined using a sensor of a mobile device. As a result of global positioning system signals becoming unavailable due to the mobile device traveling indoors, the mobile device implements a sensor-based position determination that provides a position of the mobile device as the mobile device travels about a location. In order to confirm the reliability of the sensor-based position determination, the mobile device, after passage of time or after traveling some estimated distance, requests location assistance indications from the cellular network. A processor of the mobile device receives the location assistance indications and generates a directional vector based on several of the location assistance indications. Using the directional vector, the processor confirms the reliability of the dead reckoning position.

20 Claims, 5 Drawing Sheets

200

300

RADIO ACCESS NETWORK SERVICE-ASSISTED, SENSOR BASED INDOOR NAVIGATION

BACKGROUND

As of today, location based services have become widely available and popular among users of mobile devices. Systems, such as Global Positioning System (GPS), Global Mobile Satellite System (GMSS), Galileo, are equipped to provide location services to mobile devices whenever the mobile device is outdoors. For example, when outdoors, the use of GPS by a mobile device allows the mobile device to fairly accurately determine device location and possibly obtain or present other location related information.

However, after moving indoors, some or all of the requisite GPS signals are often unavailable or too weak to provide reliable (or any) location services. Similar problems may occur outdoors where signals from at least some of the GPS satellites are blocked by buildings or other obstacles, for example, in an urban canyon amongst high-rise buildings in a city center.

To address the lack of reliable indoor location services, alliances, such as In-Locations, consortiums, and companies have proposed proprietary systems that utilize indoor beacons based on Wi-Fi and/or Bluetooth signals. Such systems may require modification to the current Wi-Fi and Bluetooth chipsets for mobile devices as well as deployment of enabled Wi-Fi access points and Bluetooth beacons. With this architecture, the owners of the enabled beacons will be the sole service provider for that location and they will own the location information of the beacons. As a result, users have to log into to the service, or configure their devices to access (or pair with) the respective Wi-Fi or Bluetooth access points.

Another method of location when GPS location determination is not feasible uses inertial sensors, magnetometers, and barometers, which are increasingly common in mobile devices, to accurately map the movements of a mobile device as well as the user carrying the device. The mapping is based on an earlier known position of the mobile device obtained via GPS or a radio access network, such as Wi-Fi or a cellular network. Such location determinations rely on a low power, always "ON" sensor hub (e.g., a microprocessor that integrates data from different sensors on a device and manages the processing data) in the mobile device to carry out a sensor fusion algorithm and to regulate the ON time of the sensors such that the sensors do not cause the mobile device power usage to extend beyond the power envelope of the device when the device is in standby. An advantage of this type of solution, sometimes commonly known as dead reckoning, is that the device can provide reasonably accurate location and does not require costly deployment of a proprietary infrastructure (e.g., Wi-Fi/Bluetooth beacons).

The sensors required for such a dead reckoning position or movement determination are already in most modern mobile devices so that the additional cost to enable this solution is relatively low. Sensor fusion makes use of the different sensors on the mobile device such as a magnetometer, a gyroscope, an accelerometer and a barometer.

The result of the sensor fusion, however, is not a highly accurate location determination, the location is always relative to a prior position. Due to variations in the outputs from the different sensors, the accuracy of the location determinations inherently drifts over time. Also, external conditions will affect the accuracy of the sensors. For example, stray magnetic fields in the environment can cause errors in the magnetometer, or the temperature of the device may affect operation of the gyroscope or accelerometer. The use of Kalman filters can help remove some errors or otherwise reduce errors, but not all of the errors are eliminated by such filters. As a result, errors with dead reckoning solutions accumulate over time, and unless external information is provided to help remove, or mitigate, the accumulated errors, the accumulated errors increase. If not mitigated in an appropriate timely manner, the accumulated location error may increase over time to a point that the dead reckoning location information becomes unreliable.

Accordingly, there is a need for confirming the accuracy of the dead reckoning location solutions provided by the sensory navigation functions of a mobile device.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples of a mobile device and method disclosed herein relate to insuring that a position determined using mobile device sensor inputs is fairly reliable. For example, once indoors a mobile device may not have access to a GPS signal that will allow the mobile device to determine its position as the mobile device moves through the indoor premises. Just before the device moves indoors, the mobile device may have stored in memory a last position that was determined using GPS. This last GPS position may be used as a reference starting location for the indoor location functions. From that point on, the sensors can provide a relative location to the reference point. When GPS signals become available, the described examples may revert to use of the GPS signals for position determination.

After some time, the relative location will begin to exhibit errors and may diverge from an actual travel path of the mobile device. In order to address the errors, the mobile device uses signals from the cellular network. Based on the cellular network signals, the mobile device is able to determine a coarse location of the mobile device. After multiple coarse locations are determined, the mobile device generates a general directional vector that corresponds to the movement of the mobile device over some period of time, e.g. since the last determination of a reference position. So long as the relative position location determined using the sensors tracks the general directional vector of the mobile device, the sensor determined relative position location is considered sufficiently accurate or reliable. If it is determined that the relative position location is unreliable, a correction parameter is input to compensate for errors in the sensor determination. The correction parameter may be a one-time correction factor that is applied to the coordinates of the relative position location (e.g., error is 10%, so the coordinates are multiplied by 1.10), or may be a more complex correction formulation in which one or more coefficients related to one or more sensors is determined to need modification.

For the sake of convenience, the following discussion focuses on examples where the user/mobile device are indoors; however, the examples of the present approach may be used in any situation where a more accurate location system like GPS is unavailable for some reason.

Figure 1:
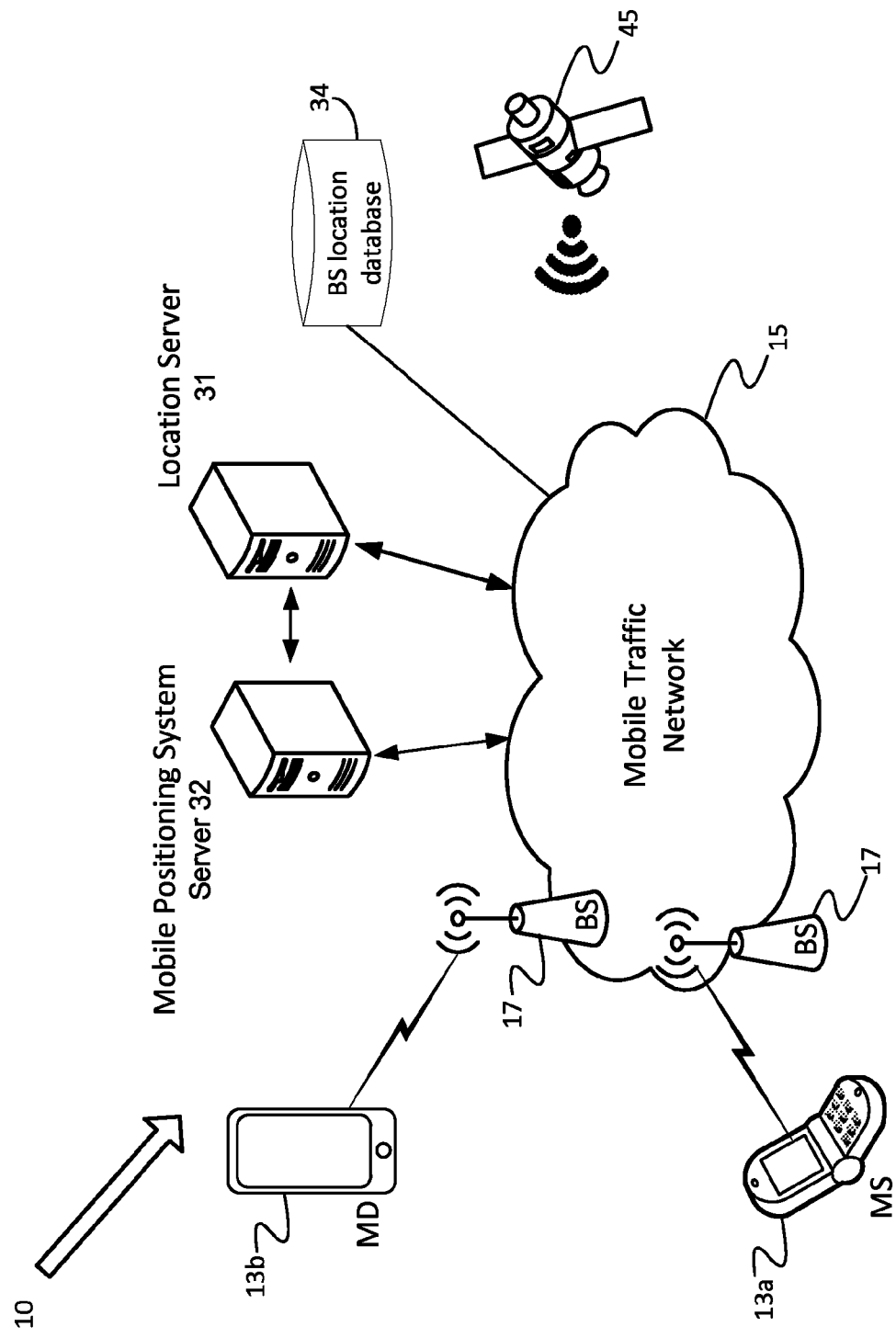
FIG. 1 is a high-level functional block diagram of an example of a system of networks/devices that provide various communications for mobile devices and support an example of the sensory navigation confirmation service.

Reference now is made in detail to the examples illustrated in the accompanying drawings and discussed below. FIG. 1 illustrates a system 10 offering a variety of mobile communication services, including location methods for mobile device users. System 10 may associate events for mobile devices 13 based on a probability that the mobile device is proximate a predetermined area. The example shows simply two mobile devices (MS s) 13a and 13b as well as a mobile communication network 15. The devices 13a and 13b are examples of mobile devices that may be used for the location method. However, the network will provide similar communications for many other similar users as well as for mobile devices/users that do not participate in the location method. The network 15 provides mobile wireless communications services to those devices as well as to other mobile devices (not shown), for example, via a number of base devices (BSs) 17. The present techniques may be implemented in any of a variety of available mobile networks 15 and/or on any type of mobile device compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile devices 13 are capable of voice telephone communications through the network 15, and for the location method. The devices 13a and 13b are capable of data communications through the particular type of network 15 (and the users thereof typically will have subscribed to data service through the network).

The network 15 allows users of the mobile devices such as 13a and 13b (and other mobile devices not shown) to initiate and receive telephone calls to each other as well as through the public switched telephone network (PSTN) (not shown) and telephone devices (not shown) connected to the PSTN. The network 15 typically offers a variety of data services via a global network (e.g., the Internet) (not shown), such as downloads, web browsing, email, etc. The mobile devices 13a and 13b of users of the location method also can receive and execute applications written in various programming languages, as discussed more later.

Mobile devices 13 can take the form of portable handsets, smart-phones or personal digital assistants, although they may be implemented in other form factors. Program applications, including an application to assist in the location method and/or any application purchased via the location method can be configured to execute on many different types of mobile devices 13. For example, a mobile device application can be written to execute on a binary runtime environment for mobile (BREW-based) mobile device, a Windows Mobile based mobile device, Android, iOS iPhone or iPad, Java Mobile, or RIM based mobile device such as a BlackBerry or the like. Some of these types of devices can employ a multi-tasking operating system.

The mobile communication network 15 can be implemented by a number of interconnected networks. Hence, the overall network 15 may include a number of radio access networks (RANs), as well as regional ground networks interconnecting a number of RANs and a wide area network (WAN) interconnecting the regional ground networks to core network elements. A regional portion of the network 15, such as that serving mobile devices 13, can include one or more RANs and a regional circuit and/or packet switched network and associated signaling network facilities.

Physical elements of a RAN operated by one of the mobile service providers or carriers include a number of base devices represented in the example by the base devices (BSs) 17. Although not separately shown, such a base device 17 can include a base transceiver system (BTS), which can communicate via an antennae system at the site of base device and over the airlink with one or more of the mobile devices 13, when the mobile devices are within range. Each base device can include a BTS coupled to several antennae mounted on a radio tower within a coverage area often referred to as a "cell." The BTS is the part of the radio network that sends and receives RF signals to/from the mobile devices 13 that are served by the base device 17. Later generation mobile networks utilize wireless access elements, each referred to as an eNodeB, to provide functions similar to those of a base device; but for convenience, the discussion here will generally include eNodeBs and other network wireless access devices under the general term base device.

The radio access networks can also include a traffic network represented generally by the cloud at 15, which carries the user communications and data for the mobile devices 13 between the base devices 17 and other elements with or through which the mobile devices communicate. It will be understood that the various network elements can communicate with each other and other aspects of the mobile communications network 15 and other networks (e.g., a PSTN and the Internet) either directly or indirectly.

Although not shown, the carrier may also operate a number of systems that provide ancillary functions in support of the communications services and/or application services provided through the network 15, and those elements may communicate with other nodes or elements of the network 10 via one or more private IP type packet data networks (sometimes referred to as an Intranet), i.e., a private network. Examples of such systems may include one or more application servers and related authentication servers.

A mobile device 13 communicates over the air with a base device 17 and through the traffic network 15 for various voice and data communications. If the mobile service carrier offers the location service, the service may be hosted on a location server 31, for communication via the network 15. Alternatively, programming for the location service may be distributed across multiple components of system 10. For a given service, including the location service, an application program within the mobile device may be considered as a 'client' and the programming at location server 31 may be considered as the 'server' application for the particular service.

Figure 3:
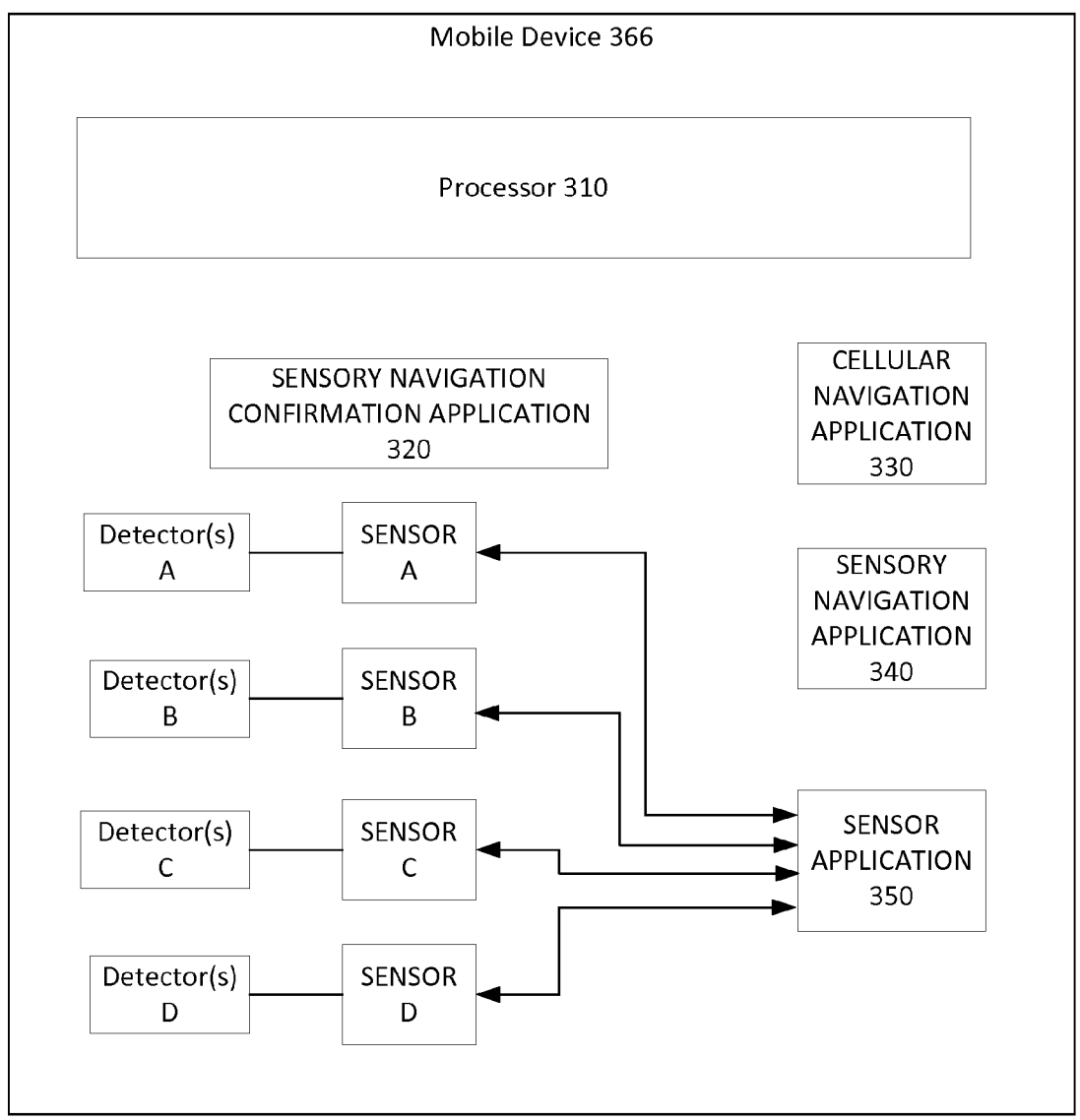
FIG. 3 shows a functional block diagram of an example of a mobile device software/firmware implementation of components that provide the sensory navigation confirmation service.

The location server 31 may be configured to receive mobile positioning information for mobile device 13 from mobile positioning system 32. For example, the location server 31 may receive the mobile positioning information through traffic network 15. Alternatively, location server 31 may receive the mobile positioning information from mobile device 13 (for example, from a satellite positioning system (SPS) 121, as shown in FIG. 3), through traffic network 15.

The mobile positioning system 32 may be of any type. For example, the mobile position system 32 may use base device triangulation to determine the mobile positioning information based on the nearest base device identification. The mobile positioning system 32, may, in addition or instead, use measurements of signaling characteristics between the mobile device 13 and multiple base devices, e.g., such as timing of transmissions by the respective BSs 17. For example the mobile positioning system 32 inform a mobile device such as 13a or 13b that respective BSs 17 (i.e., eNodeBs) will transmit a signal (e.g., a synchronization signal) on the same transmission frame. After receipt of the signal, the respective MDs 13a and 13b send timing information related to the received signals to the BSs 17 (eNodeBs). The BS 17 receives timing signals to determine where the MD 13a or 13b is positioned. In addition or instead, the mobile positioning system 32 may include a satellite positioning system (SPS) 45, such as a Global Positioning system (GPS) chip set configured to determine the geographic location of the mobile device 13 based on trilateration of positioning signals from global satellites. The mobile positioning system 32 may, in addition or instead, include an architecture that uses both a SPS as well as network elements to determine position, such as Assisted GPS (AGPS). In general, SPS data may provide a more precise mobile device position (i.e., with less uncertainty) compared with base device triangulation or trilateration (i.e., having increased uncertainty). SPS data, however, may not be available for some wireless networks operating today and/or for some mobile device locations (e.g. inside buildings or the like). Each mobile positioning technique includes a different uncertainty of position. For example, mobile positioning techniques, from a highest uncertainty to a lowest uncertainty, include cell identification (accuracy within about 200 m), triangulation (accuracy between about 100 m to about 500 m), fingerprinting (accuracy within about 10 m), SPS (accuracy between about 5 m to about 40 m), and AGPS (accuracy between about 1 m to about 10 m).

The location server 31 is configured to identify a current probable location of the mobile device 13 based on the mobile positioning server 32 information related to the MD 13a or 13b. The location server 31 may also update the location history database 36 based on the estimated probability of the respective MDs' coarse location. In addition, the location server 31 may be configured to perform functions to determine probable location information regarding the respective mobile devices 13a and 13b.

Figure 2:
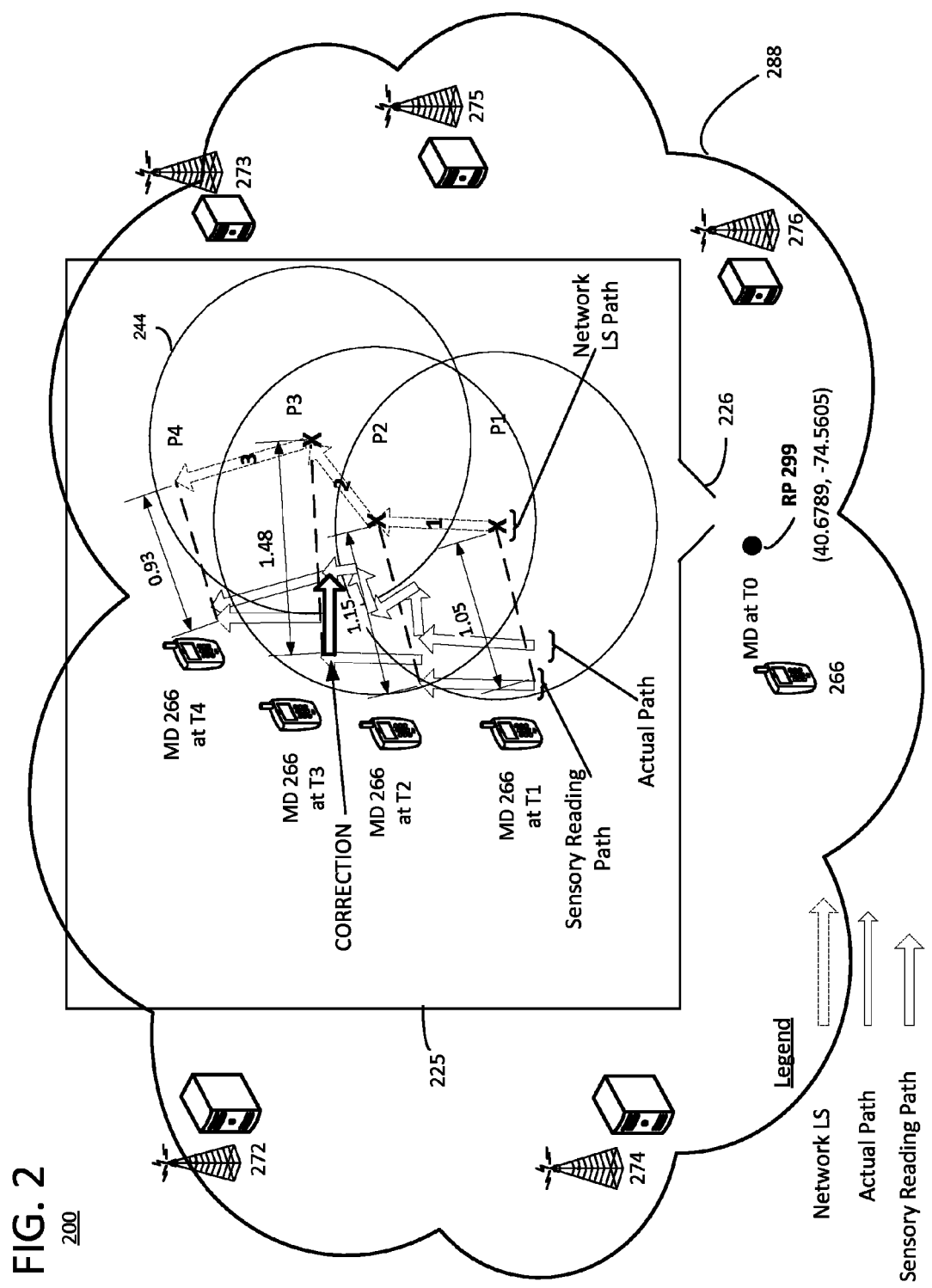
FIG. 2 illustrates an example of an implementation of the sensory navigation confirmation service described herein.

FIG. 2 illustrates an example of an implementation of the presently disclosed position confirmation process. The system 200 includes a cellular communication network 288 that encompasses a number of base devices (e.g. eNodeBs) 272-276 that facilitate the provision of cellular communication services to mobile devices, such as mobile device (MD) 266, within a coverage area, such as a cell, of the cellular communication network 288. Within the cellular communication network 288 coverage area are a number of indoor locations, such as malls, stadiums, movie theatres, parking garages, office buildings, and other areas, such as urban canyons or outdoor locations in which satellite positioning services (SPS) are not available. The indoor location 225 is such an area where SPS is unavailable. "Unavailable," in the context of the disclosed examples, means the SPS are undetected by the MD 266 or, if detected, the SPS signal strength is so weak or the number satellites providing SPS signals is insufficient to ascertain SPS position information. Unavailable, in some examples, is also considered unreliable.

The cellular communication network 288 via the base devices 272-276 may provide location services to the MD 266. A number of different location determination techniques may be used by the network, such as a long term evolution (LTE) positioning protocol (LPP), downlink position method, uplink position method support, cell identification (CID), enhanced cell identification (E-CID), an observed time difference of arrival (OTDOA), enhanced observed time difference of arrival (E-OTDOA) or a combination thereof.

As described above, the cellular communication network 288 may operate according to a number of different standards 3GPP, CDMA, GRMS and LTE and the like, and each different standard may provide some form of location assistance for the mobile devices, such as MD 266, operating within the respective cellular communication network. For example, in an LTE network, a location determination technique of OTDOA that may be used to determine a coarse location of the MD 266 within the coverage area of the network 288.

One or more BS (i.e., eNodeB), such as 272-276, transmit over-the-air a signaling positioning reference signal. Although five eNodeBs are shown, the MD 266 can monitor up to 24 different signals transmitted by 24 different respective eNodeBs. Using OTDOA techniques, the MD 266 may measure signaling time and determine location of MD 266 with respect to each of the respective eNodeBs 272-276. A mobile traffic network (i.e., a cellular communication network) component, such as base device (BS) location database 34, may store the absolute locations of all of the eNodeBs in the network. Some or all of the eNodeB location information may also be stored in a memory of the MD 266.

Given the absolute positioning of the eNodeBs and the measured time differences of the eNodeBs, location data of the MD 266 can be derived. Current OTDOA as defined in the 3GPP standard provides a location range (e.g., the range is between 10 and 50 meters) in which the position of the MD 266 may fall since the accuracy of the OTDOA technique is limited.

In FIG. 2, the OTDOA location range is shown in the form of circle 244, and may be defined by an X-Y coordinate with a certain radius value. The true location of the MD 266 is somewhere within the circle 244 with a high probability (e.g. within three times the standard deviation). Four probable positions P1-P4 are shown in FIG. 2, and each position is centered within a circle similar to circle 244. Although the radius for the location uncertainty may be fairly large, e.g. 50 meters, the point to point location, or general directional, vector may be much more accurate. The greater accuracy of the general directional vector is occurs because within short distances (of the user's travel), the eNodeB(s) being used are the same and the relative positioning tolerances remain fairly constant from one position (e.g., P1-P2 or P2-P3) to another position. Multiple OTDOA point readings (e.g., P1-P2 and P2-P3) can be stitched together to form directional vectors. For example, a directional vector, labeled 1, is formed using OTDOA point readings P1 to P2.

The success of the OTDOA technique depends on the absolute location information of the eNodeBs 272-276, and the network synchronization of the respective eNodeBs 272-276 with the MD 266. For example, at a predetermined time according to a previously established schedule or in response to a request from the MD 266, each eNodeB 272-276 generates a signal at a specific time that is known to the MD 266. The MD 266 detects the signal transmitted by the specific eNodeB and timestamps a record indicating receipt of the received signal with the time of the detection. By receiving the signal, the MD 266 has information identifying the eNodeB (e.g., derived from the timing of the received signal or from identifying information in the received signal) and the timestamp. The MD 266 has information for one or more of the respective eNodeBs that are communicating with (or being monitored by) the MD 266. The MD 266 using the timestamp and information of when the respective eNodeB transmitted the signal is able to calculate the observed time difference between the transmission time of the signal by the respective eNodeB and the reception of the signal. Depending upon the configuration of the MD 266, the MD 266 calculates its location based on the observed time differences from each of the respective eNodeBs, or sends the signal timing information (e.g., timestamp and eNodeB identifying information) to a server, such as MPS server 32. For example, if the absolute location of the respective eNodeBs is stored in the MD 266 memory, the MD 266 calculates its location using the timestamp and location information. Alternatively, if the eNodeB absolute location is stored by the network, the MD 266 sends the signaling information with a request that a network server calculate the location based on the observed time differences.

Continuing with the example of FIG. 2, the OTDOA readings (i.e., coarse locations) can be used to correct slight directional errors in the sensory readings. The process of correcting slight directional errors may more accurately be described with an example. The example of FIG. 2 illustrates a MD, such as MD 266, at different times (e.g., T0-T40) as the MD 266 travels from outdoors through a doorway 226 into the indoor structure 225. Different paths of the MD 266 are shown, the actual path of the mobile device as the user travels indoors 225 is shown by the solid line arrows in the center, the sensory reading path determined using the inputs to sensors is shown to the left of the actual path, and a path generated from signals provided by a network location service (LS) (e.g., network-assisted location determination) discussed above with respect to the OTDOA technique. Of course, other network-assisted location determinations may be used to provide similar correction information of the sensory reading information. The following discussion will refer to the MD 266 moving or traveling, but it should be understood that the MD 266 is in the possession of a user and is being carried by the user. In other words, the MD 266 travels with a user.

At time T0, the MD 266 (and the user carrying the MD 266) is located outside the indoor structure 225. The MD 266 is communicatively coupled with one or more of the BS 272-276 at time T0. Since the MD 266 is not inside the indoor structure 225 at T0 (i.e., the MD 266 is outdoors at T0), SPS is still available to the MD 266. As a result, the MD 266 may store coordinates (e.g., latitude (40.6789) and longitude (−74.5605)) of the MD's 266 precise location. Of course, the given latitude and longitude are for example only, and that other coordinate systems may be used. This precise location may be the last location information that the MD 266 has before a determination is made that the MD 266 has entered the indoor structure 225. As a result, this last location information is considered a reference point, shown as RP 299. Note that the location of RP 299 is only an example, and that the RP 299 may be located wherever a last location determination via SPS is made. For example, reliable SPS signals may be available just inside the doorway 226 of the indoor structure 225, or the location may be further from the doorway 226 because, for example, the indoor structure 225 may be so tall as to effectively block SPS signal reception by the MD 266 on the side of the building at which the doorway 226 is located. As discussed herein, the reference point RP 299 is the last location of the MD 266 that is identified by SPS coordinates. The RP 229 is also the last location that reliable SPS (e.g., GPS, Galileo and the like) signaling is available, and after the MD 266 moves to a location, whether indoors or outdoors, at which the SPS signaling is considered unavailable and/or unreliable. Or, in another example, GPS is unavailable and/or unreliable when the GPS receiver of the MD 266 is not receiving GPS signals sufficient for determination of a GPS-based position fix.

As the MD 266 moves into the indoor structure 225, the MD 266 determines sometime between the times T0 and T1 that SPS signals are unavailable. For example, the GPS signal strength has fallen below a predetermined threshold (e.g., 15% signal strength as opposed to 100% or some other threshold). In response to the determination that SPS signals are unavailable, the MD 266 begins using sensory navigation to determine a position of the MD 266. For the time being, sensory navigation is provided by non-radio frequency sensors within the MD 266 that are used to perform a dead reckoning function based on the RP 299. In an example, in response beginning to use sensory navigation, a notification (e.g., a message or an icon and/or an audio notification) is presented on an output (e.g., display device or speaker) of the MD 266 indicating that sensory navigation is in use.

For example, at time T1, the MD 266 retrieves a prior GPS-based position fix (e.g., RP 299, which is used as a reference point) from a memory of the MD. Using the prior GPS-based position fix, the MD 266 determines a relative location using the sensory inputs to determine direction and distance traveled relative to the reference point. The structural aspects of sensory navigation will be discussed in more detail with reference to FIGS. 3-5.

Returning to time T1, the MD 266 is inside indoor structure 225, and a first relative position determination is made using sensory navigation. Note that the distance between the RP 299 and the position at which the MD 266 determined that SPS signals were unavailable is within presently used threshold (constraints, ranges), so the MD 266 has not traveled such a distance that the RP 299 is irrelevant for use in a dead reckoning calculation.

At this time it may be appropriate to discuss an example of a manner of determining the relative location by the MD 266 using the sensory input signals. For example, the sensory inputs for performing the relative position determination are derived from signals provided by at least one of an inertial sensor, an accelerometer, a magnetometer, a gyroscope, or a barometer within the MD 226. These sensors generate signals based on environmental conditions detected by detectors associated with the particular type of sensor. For example, the accelerometer detects the acceleration of the MD 266 in a particular direction, the magnetometer detects magnetic fields around the MD 266 and output signals may be used with a compass application, the gyroscope provides an indication of the orientation of the device in at least three axes, and the barometer provides an signals indicative of air pressure that may be used by an application to indicate vertical locations (e.g., first floor versus twentieth floor). These elements with respect to the MD 266 will be described in more detail with respect to FIGS. 4 and 5. It is sufficient for this discussion that based on the sensor outputs, the MD 266 is able to determine the direction of travel and distance traveled. As a result, the MD 266 is able to update a relative location based on the prior GPS-based position fix. In addition, using the relative location information from time T1 as a new reference point and sensor information generated subsequent to the relative location determination at time T1, the MD 266 is able make new relative location determination at time T2.

However, a disadvantage of this method of location determination, which is referred to as "dead reckoning," is that any errors in any of the inputs or calculations are propagated through to subsequent position determinations, and can result in location determinations that are not even close to an actual location. Hence, an advantage of the examples provided herein is that these errors may be corrected before the errors propagate unabated.

Also, near the time T1, the MD 266, for example, generates a request for a network-assisted location determination to the cellular communication network 288. In response to the request, for example, the respective eNodeBs 272-276 generate the respective signals when OTDOA, as discussed above, is used as the network-assisted location determination. The network-assisted position determination, shown as the network LS reading, is a coarse location determination, which, as explained above, has a probability associated with it. The first coarse location determination is referenced by the label P1. After obtaining the coarse location determination, the MD 266 may confirm that the relative location at time T1 is substantially correct by comparing the latest relative location (e.g., the relative location of the mobile device at time T1) with the determined directional vector that is generated based on the network-assisted coarse location, and outputs an indication of the difference. The outputted difference indication is, for example, a value indicating a difference between the latest relative position and the determined directional vector. For example, a substantially exact match may return a value of 1.00, and a difference threshold may be 0.20 or some other value. In other words, in this example, if the difference value is not less than 0.80 or not greater than 1.20, the difference threshold is not exceeded. The difference threshold may also be expressed as a percentage or statistical measurement. Since the difference between the T1 relative location and the coarse position P1 illustrated in FIG. 2 is equal to 1.05 (i.e., the difference value=1.05), no action is taken to correct the slight diversion from an exact match. As a result, the output indicates that the accuracy indication of the relative location remains within a threshold variance of the location indicated by the motion vector. The MD 266 continues to perform the sensory navigation location determination as the MD 266 travels within the indoor structure 225 from a position represented by time T1 to the position represented by time T2. While navigating using the sensory navigation, the MD 266 uses the last relative location, at time T1 as a reference point. Note that the sensory navigation is frequently (e.g., every 10 milliseconds or less) updating the relative location more often than the time between T1 and T2.

At time T2, the MD 266 again (either in response to a request or according to the predetermined schedule) receives from the network 288 or makes another coarse location determination (indicated by the label P2). The time, for example, between T1 and T2 may vary based on various conditions. For example, the MD 266 is configured to monitor over time (i.e., historically) the accuracy of the sensor data with respect to the coarse location information, and if the monitoring indicates that the sensor data is sufficiently accurate, the time between T1 and T2 is longer (e.g., greater than or equal to 10 seconds); however, if the sensor data accuracy is below a particular accuracy threshold, the time between T1 and T2 may be shorter (e.g. less than 10 seconds). In another example, the time between T1 and T2 is use based. In other words, the time is based on how the MD 266 is being used. For example, if the MD 266 is stationary, then the intervals between coarse location determinations are longer. On the other hand, if the user is walking, then more frequent coarse location requests are made. In an example in which accurate walking path data is to be displayed, more frequent coarse location requests are also made. If a very accurate walking path is not needed, the coarse location requests may be made less frequent. In that case, the user's walking path in between the coarse location determinations may not be as accurate but the end point accuracy would be the same. In an example, the timing between time T1 and T2 is determined so that a directional vector that approximates the position of the MD 266 between the coarse location P1 and the coarse location P2 may also be determined. For example, the network 288 may accommodate multiple coarse location (e.g., OTDOA) requests from the MD 266, and for each request the MD 266 may make 8, 16, or 32 OTDOA measurements. The measurements performed by the MD 266 may be at least 160 milliseconds (ms) apart. Alternatively, the MD 266 may also perform measurements that are multiples of 160 ms apart (e.g., 320 ms, 640 ms and the like). Of course, other measurement intervals may be used. The directional vector is constructed using the coarse location points and may take the form of two dimensional coordinates from which may be derived an equation that indicates a projected direction of travel of the MD 266. If taken in brief increments (e.g., measured in milliseconds or less than tens of seconds (i.e., <10 seconds)), and even given the coarseness of the location due to the probability range, or tolerance, of the coarse location, the directional vector, is able to approximate with suitable precision a path of the MD 266.

For example, depending on the accuracy of the sensors in the MD 266, which may differ depending upon a particular device model, there is a base sampling rate for requesting a coarse location determination in order to keep correct any errors with the determination of the relative location based on the sensor data. For example, less accurate sensors require greater assistance from the network, while more accurate sensors require less network assistance. The directional vector is represented by the arrow from P1 to P2 and labeled the network LS path.

Returning to the example, at or about time T2, the MD 266 confirms that the relative location is substantially correct by comparing the latest relative location (e.g., the relative location of the mobile device at time T2) with the determined directional vector (labeled 1) that is generated based on the network-assisted coarse location, and outputs an indication of the difference. The outputted difference indication is, for example, a value indicating a difference between the latest relative position and the determined directional vector. For example, a substantially exact match may return a value of 1.00, and a difference threshold may be 0.20 or some other value. In other words, in this example, if the difference value is not less than 0.80 or not greater than 1.20, the difference threshold is not exceeded. The difference threshold may also be expressed as a percentage or some statistical measurement. Since the difference between the T2 relative location and the coarse position P2 illustrated in FIG. 2 is 1.5 (i.e., the difference value=1.05), no action is taken to correct the slight diversion from an exact match. As a result, the output signal, in this example, indicates that the accuracy indication of the relative location remains within a threshold variance of the location indicated by the motion vector.

After time T2, the user carries the MD 266 on a circuitous route and the relative location as shown by the sensory reading path at time T3 is further away from the actual path also substantially at time T3. As discussed above the cellular network 288 provides a network assisted coarse location at about time T3 is shown at P3. Again, the MD 266 confirms that the relative location is substantially correct by comparing the latest relative location (e.g., the relative location of the mobile device at time T3) with the determined directional vector (labeled 2) that is generated based on the network-assisted coarse location, and outputs an indication of the difference. This difference between the network-assisted coarse location indicated by the directional vector and the relative location has a difference value of 1.48. Using the difference threshold of 1.20 from the previous determination, the difference value of 1.48 exceeds to the difference threshold by 0.28.

In an example, in response to the determination that the difference value has been exceeded, the MD 266 may request another network-assisted coarse location from the network 288 to confirm the general accuracy of the coarse location. The network-assisted coarse location may be outside the probability range because, for example, network connectivity of the MD 266 may have transferred from one eNodeB to another eNodeB. In some instances, such transfers may cause location determination errors. If the confirmation network-assisted coarse location indicates that the prior coarse location was an aberration, the application (executing on the MD 266 processor) may have a default in which the relative location provided by the sensory navigation is used to calculate the motion vector. In this example, either with or without a reconfirmation of the coarse location, it is determined that the relative location provided by the sensory navigation was in error. For example, one or more of the sensors, after some time, may begin to drift due to various reasons having to do with the environment of the MD 266 or with the construction of the respective sensors. For example, the construction and/or configuration of some sensors may make the sensor susceptible to overheating or spurious inputs, such as magnetic fields intense lighting or the like.

Since at time T3, the sensory navigation output is determined to be incorrect, a sensory navigation confirmation application executing on the MD 266 may inspect a current output of the respective sensors to benchmark (or historical) outputs of the respective sensors. For example, historical outputs may be stored in a memory of the MD 266 for referral while the sensory navigation application is executing or the like. Similarly, for example, the respective sensors may include benchmark information that connected systems, or the sensors themselves, may use to calibrate the respective sensors to a particular use case, environment or the like. For example, in the case of a sensor fusion navigation implementation, while the particular sensor may recalibrate to remain within the sensor's benchmark setting, such recalibration may affect other sensors whose data is used in the sensor fusion navigation. To address such a scenario, a sensory navigation confirmation application may be executed by the MD 266 processor. These programming aspects of the MD 266 will be described in more detail with reference to FIGS. 3-5.

Returning to FIG. 2, in response to the difference indication of exceeding the difference threshold, the MD 266 via, for example, the sensory navigation confirmation application may generate a correction parameter. The correction parameter may represent a correction to the relative location determination, a correction to one or more of the sensors that provide inputs to the sensory navigation application, or a correction to the sensory navigation application. For example, the sensory navigation confirmation application using the difference value (e.g., 0.28) generates a change (e.g., based on a correspondence table in which a certain difference value indicates a certain correction parameter setting) or the like) to the relative location as illustrated by the Correction arrow in FIG. 2. In another example, the sensory navigation confirmation application may determine, as mentioned above, based on a sensor benchmark that a sensor output is incorrect, and the sensory navigation confirmation application generates a correction parameter (i.e., change of coefficient setting). In a further example, the sensory navigation confirmation application may apply a correction parameter to the sensory navigation application that, for example, modifies the algorithm that determines the relative location or that simply modifies the output (i.e., the relative location) based on the applied correction parameter. In any of the examples, a correction to the relative location is made such that the difference value falls within the difference threshold. The relative position is corrected since as explained above the MD 266 performs it sensory navigation based on the last relative location, which in this case, would be the corrected relative location at time T3.

After time T3, the MD 266 continues to determine its relative location via the sensory navigation until time T4. At time T4, the MD 266 again generates a request for network assistance. Upon receipt of the coarse location information, another directional vector (labeled 3) is generated. Similar to previous occurrences, the MD 266 confirms the relative location via a comparison with the directional vector (3).

The above described examples provide a sensory navigation confirmation application that maintains the accuracy of the sensory navigation system when GPS is unavailable to provide position information. At this time, it may be appropriate to discuss the interaction of the different applications and services that provide the sensory navigation confirmation.

FIG. 3 shows a functional block diagram of an example of a mobile device software/firmware implementation of components that provide the sensory navigation confirmation service. The MD 366 of FIG. 3 includes a processor 310, a sensory navigation confirmation application 320, a cellular navigation application 330, a sensory navigation application/service 340, a sensor application 350 connected to one or more of the MD 366 sensors (A-D) that are connected to one or more detector(s) (A-D). The processor 310 may execute the program code that executes the various applications 320-340 and control the interaction of the various applications 320-340. The detector(s) A-D and respective sensors A-D may be one or more of an accelerometer, a magnetometer, a barometer, a gyroscope, a camera, a microphone, or an inertial sensor. In addition each of the sensors may include one or more detectors, such as one or more accelerometers to detect acceleration in more than one axis. In another example of a sensor including one than one detector, an inertial sensor is a device that combines one or more other sensors and provides an indication of acceleration, vibration, tilt, rotation, shock (i.e., sudden impacts) and the like. The sensors and the respective detectors may be micro-electro-mechanical (MEM) machines configured to detect the respective inputs to the MD 366. In addition, some of the detectors, such as the barometer, camera and microphone, may be configured to detect environmental conditions external to the MD 366. Note, in this example, that none of the sensors are radio frequency transceivers that detect radio frequencies, such as Wi-Fi or Bluetooth. Of course, the MD 366 includes other components, such as a memory, cellular transceiver and a GPS receiver, but for ease of explanation of the present example these components and others in the MD 366 are described in more detail with respect to FIGS. 4 and 5.

In fact, the GPS receiver (shown in the examples of FIGS. 4 and 5) is an initiator of the described example. For example, the GPS receiver indicates an error if the GPS receiver is unable to provide a location. Due the GPS receiver being unable to obtain sufficient GPS signal coverage, which thereby renders GPS unavailable, the MD 366 processor 310 takes alternative actions to determine a location. For example, the sensory navigation application 340 launches either by request received from the processor 310 or automatically via an indication (of lack of sufficient GPS signals) received from the GPS receiver. Upon launch, the sensory navigation application 340 initiates contact with the sensor application 350. The detectors A-D receive signals from the detectors, which the respective sensors A-D process to output a signal indicative of detected condition to the sensor application 350. The sensor application 350 receives inputs from the respective sensors A-D.

The sensor application 350 may process the inputs from the respective sensors A-D and store the processed inputs in memory for use by other components (not shown) or provide them to the sensory navigation application 340. The sensory navigation application 340 may retrieve a reference point position (e.g., prior GPS-based position determination) stored in memory. Using the reference point position, the sensory navigation application determines, at predetermined intervals, a relative position of the MD 366 using the inputs from one or more sensors on the MD 366 based on the sensor application 350 processing of the inputs. At another time, the MD 366 using the cellular navigation application 330 transmits, via a radio frequency transceiver (shown in the examples of FIGS. 4 and 5) in the MD 366, a request for a network location assistance information from the mobile (i.e., cellular) communication network (as shown in FIGS. 1 and 2). The mobile communication network responds to the request with network location assistance information that is received by the cellular navigation application 330. The network location assistance information is a coarse indication of the location of the MD 366 within the mobile communication network coverage area.

The cellular navigation application 330 may perform the location determination via one or more location determination techniques, such as OTDOA described above, to determine the coarse location. The processor 310 via the sensory navigation confirmation application 320 generates a general directional vector of the movement of the mobile device based on network location assistance information received from the cellular navigation application 330. The sensory navigation confirmation application 320 may store in the memory receiving the network location assistance information each time or on each occasion that the information is received.

After some time, the sensory navigation confirmation application 320 confirms that the relative location provided by the sensory navigation application 340 is reliable. As mentioned above with reference to FIG. 2, a comparison is performed by the sensory navigation confirmation application 320 of a location indicated by the general motion vector of the movement of the mobile device to the relative position generated by the sensory navigation application, which is stored in memory. Based on the results of the comparison, the sensory navigation confirmation application 320 outputs a signal indicating the reliability of the relative position. For example, if the signal indicates that the difference value is within the difference threshold, the signal may be a null or some other value that is interpreted by the respective applications 330-350 that no setting changes are needed. Alternatively, the sensory navigation confirmation application 320 may address the output that includes a correction parameter or indicates a forthcoming correction parameter to a respective component in the MD 366.

In some examples, the sensory navigation application 340 algorithm makes additional requests for timing signals when determining a coarse location when it detects conditions that may degrade its performance. These conditions include, for example, walking speed/gait or carrying position changes that affect sensor orientation; sensor calibration periods; challenging indoor magnetic fluctuations; or in general, any noisy environment that causes the sensory navigation application 340 algorithm to have low confidence in the relative location. In another example, or in addition, the sensory navigation application 340 algorithm may also adjust the request rate depending on the device state, i.e., if the device is active or if the device is in standby. For example, if the device is actively running a location application, more OTDOA updates are requested by the MD from the mobile traffic network (i.e., cellular communication network) in order to generate intermediate points that are important for user experience, even though it may not be necessary for error correction.

The sensory navigation application 340, in an example, presents in a user setting menu, for example, different levels of thresholds for the relative location errors and/or sensory sensitivity/accuracy settings. In addition or in another example, the user settings provide the user with the opportunity to dictate the frequency of sensor calibration periods (e.g., the number or frequency of OTDOA updates), or the like.

In some examples, the sensory navigation application 340 causes a display device to present indications (e.g., presentation of a message or an icon) that sensory navigation is in use, or that GPS position determination is available.

In examples, a map of the sensory navigation path is provided on the mobile device display that shows the user path as determined by the sensors as well as the OTDOA updates. In a further example, the mobile device display presents information, such as the location, menu or description, related to restaurants, stores, exhibits, points of interest and the like relative to the user's relative location based on sensory navigation application interactions with other applications (e.g., applications related to the respective indoor location, such as a shopping mall) or services.

It may be useful to consider the functional elements/aspects of two examples of mobile devices 13a and 13b, at a high-level.

Figure 5:
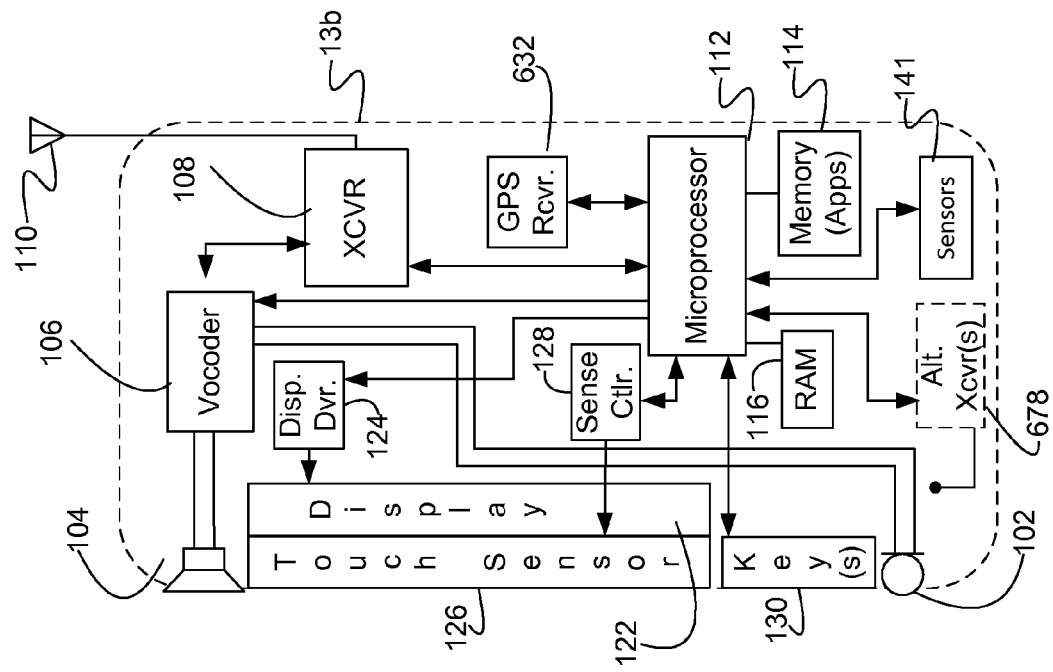
FIGS. 4 and 5 are high-level functional block diagram of respective examples of a non-touch screen type mobile device and a touch screen type mobile device that may utilize the sensory navigation confirmation service through a network/system like that shown in FIG. 1.
Figure 4:
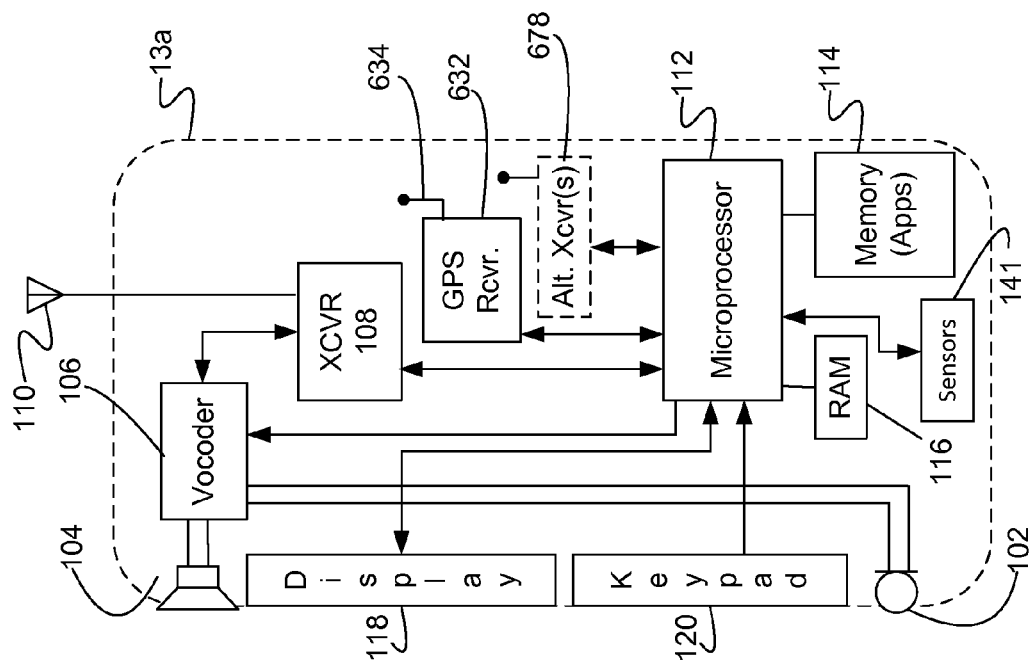

FIGS. 4 and 5 are high-level functional block diagram of respective examples of a non-touch screen type mobile device and a touch screen type mobile device that may utilize the sensory navigation confirmation service through a network/system like that shown in FIG. 1.

For purposes of such a discussion, FIG. 4 is a block diagram illustration of an example of non-touch type mobile device 13a. Although the mobile device 13a may be a smart-phone or may be incorporated into another device, such as a personal digital assistant (PDA) or the like, for discussion purposes, the illustration shows the mobile device 13a is in the form of a handset. The handset embodiment of the mobile device 13a functions as a normal digital wireless telephone device. For that function, the device 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (e.g., Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass embodiments of the mobile device 13a utilizing any digital transceivers that conform to current or future developed digital wireless communication standards. The mobile device 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13a and the communication network. Each transceiver 108 connects through radio frequency (RF) send and receive amplifiers (not separately shown) to an antenna 110. The transceiver 108 may also support various types of mobile messaging services, such as short message service (SMS), enhanced messaging service (EMS) and/or multimedia messaging service (MMS).

The example mobile device 13a includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections.

There is a variety of ways that a mobile device 13a may be configured to obtain information with respect to current location of the device. In our example, the mobile device 13a includes a global positioning satellite (GPS) receiver 632 and associated antenna 634. In addition, the sensors 141 may be coupled to detectors (not shown). The sensors 141 may include an accelerometer, a magnetometer, a barometer, a gyroscope, a camera, or an inertial sensor. The microphone 102 may also be considered a detector sensor.

A microprocessor 112 serves as a programmable controller for the mobile device 13a, in that it controls all operations of the mobile device 13a in accord with programming that it executes, for all normal operations, and for operations involved in the location procedure under consideration here and any location or event related communications. In the example, the mobile device 13a includes flash type program memory 114, for storage of various "software" or "firmware" program routines and mobile configuration settings, such as mobile directory number (MDN) and/or mobile identification number (MIN), etc. as well as information, such as prior GPS-based positions, directional vector information (e.g., vector elements) or coarse location, for future use by the sensory navigation confirmation application and related applications. The mobile device 13a may also include a non-volatile random access memory (RAM) 116 for a working data processing memory. Of course, other storage devices or configurations may be added to or substituted for those in the example. In a present implementation, the flash type program memory 114 stores firmware/software such as a boot routine, device driver software, an operating system, call processing software and vocoder control software, and any of a wide variety of other applications, such as sensory navigation confirmation application, sensory navigation application, cellular navigation application, and the sensor application. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile device 13a includes a processor, and programming stored in the flash memory 114 configures the processor so that the mobile device is capable of performing various desired functions, including in this case the functions involved in the examples of confirming a relative location technique and any associated events.

FIG. 5 is a block diagram illustration of an example of touch screen type mobile device 13b. Although possibly configured somewhat differently, at least logically, a number of the elements of the example of a touch screen type mobile device 13b are similar to the elements of mobile device 13a, and are identified by like reference numbers in FIG. 4. For example, the touch screen type mobile device 13b includes a microphone 102, speaker 104 and vocoder 106, for audio input and output functions, much like in the earlier example. The mobile device 13b also includes at least one digital transceiver (XCVR) 108, for digital wireless communications, although the handset 13b may include an additional digital or analog transceiver. The concepts discussed here encompass embodiments of the mobile device 13b utilizing any digital transceivers that conform to current or future developed digital wireless communication standards. As in the device 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS). In some examples, alternative radio frequency transceiver(s) 678, such as those configured for Wi-Fi or Bluetooth communication are optionally incorporated into the MD 13a or 13b, but the present examples of sensory navigation and sensory navigation confirmation procedures do rely, or even use, the alternative radio frequency transceivers 678 to obtain position information of the MD 13a or 13b.

A microprocessor 112 serves as a programmable controller for the mobile device 13, in that it controls all operations of the mobile device 13 in accord with programming that it executes, for all normal operations, and for operations involved in the mobile application adaptive DRX profile setting service under consideration here. A microprocessor, or generally, a processor, is a hardware circuit having elements structured and arranged to perform one or more processing functions, typically various data processing functions. Although discrete logic components could be used, the examples utilize components forming a programmable central processing unit (CPU). A microprocessor for example includes one or more integrated circuit (IC) chips incorporating the electronic elements to perform the functions of the CPU. The microprocessor 112, for example, may be based on any known or available microprocessor architecture, such as a Reduced Instruction Set Computing (RISC) using an ARM architecture, as commonly used today in mobile devices and other portable electronic devices. Of course, other microprocessor circuitry may be used to form the CPU or processor hardware in server computers or other user terminal computer equipment.

The microprocessor 112 serves as the programmable host for mobile device 13 by configuring the mobile device 13 to perform various operations, for example, in accordance with instructions or programming executable by microprocessor 112. For example, such operations may include various general operations of the mobile device 13 as well as operations related to confirming or adjusting operational settings of the mobile device 13, contacting network devices, storing user preference information, controlling encoding/decoding of voice and video data, and the like. Although a processor may be configured by use of hard-wired logic, typical processors in mobile devices are general processing circuits configured by execution of programming. The microprocessor 112 connects to other elements of the mobile device 13 via appropriate circuitry, such as bus or terminal connections. In a present example, the mobile device 13 includes flash type program memory 1064, for storage of various "software" or "firmware" program routines such as device operating system (OS), voice encoding/decoding algorithms, video encoding/decoding algorithms, programs related to graphical user interface elements and functions. The memory 1064 also stores mobile configuration settings, such as the MDN, the IMEID and/or mobile identification number (MIN), etc. The mobile device 13 may also include a non-volatile random access memory (RAM) 1033 for a working data processing memory. Of course, other storage devices or configurations may be added to or substituted for those in the example. The memories 1064, 1033 also store various data, such as telephone numbers and server addresses, downloaded data such as multimedia content and applications, and various data input by the user. Programming stored in the flash type program memory 1064, sometimes referred to as "firmware," is loaded into and executed by the microprocessor 112. For example, the navigation application code is stored in the memory 1064.

As in the example of device 13a, a microprocessor 112 serves as a programmable controller for the mobile device 13b, in that it controls all operations of the mobile device 13b in accord with programming that it executes, for all normal operations, and for operations involved in the sensory navigation confirmation procedure under consideration here and any location or event related communications. In the example, the mobile device 13b includes flash type program memory 114, for storage of various program routines and mobile configuration settings. The mobile device 13b may also include a non-volatile random access memory (RAM) 116 for a working data processing memory. Of course, other storage devices or configurations may be added to or substituted for those in the example. Hence, as outlined above, the mobile device 13b includes a processor; and programming stored in the flash memory 114 configures the processor so that the mobile device is capable of performing various desired functions, including in this case the functions involved in the location technique and any associated events.

The mobile device 13b may include optional satellite positioning system (SPS) 121 to determine the geographic location of the mobile device 13, based on positioning signals from global satellites. The SPS 121 may provide mobile positioning information to the location server 31 (FIG. 1) for the location method.

In the example of FIG. 5, the user interface elements included a display and a keypad. The mobile device 13b may have a limited number of keys 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the mobile device 13b includes a display 122, which the microprocessor 112 controls via a display driver (disp. dvr.) 124, to present visible outputs to the device user. The mobile device 13b also includes a touch/position sensor 126. The sensor 126 is relatively transparent, so that the user may view the information presented on the display 122. A sense circuit (sense ctlr.) 128 senses signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 13*b*. The microphone 102 and speaker 104 may be used as additional user interface elements, for audio input and output, including with respect to some location related functions and/or location related events for the user delivered via the mobile device.

The structure and operation of the mobile devices 13*a* and 13*b*, as outlined above, are described to by way of example, only.

There is a variety of ways that a mobile device 13 may be configured to obtain information with respect to current location of the device. In our example, the mobile device 13 includes a global positioning satellite (GPS) receiver 632 and associated antenna 634.

As shown by the above discussion, functions relating to the operation of the mobile device experience for the implementation of different functions, such as pre-provisioned device customization and the firmware-on-demand service may be performed, via a graphical user interface of a mobile device, may be implemented on computers connected for data communication via the components of a packet data network, operating as a user device and/or as a server as shown in FIG. 1. Although special purpose devices may be used, such devices also may be implemented using one or more hardware platforms intended to represent a general class of data processing device commonly used to run "server" programming so as to implement the pre-provisioned device customization functions and firmware-on-demand discussed above, albeit with an appropriate network connection for data communication.

The software functionalities involve programming, including executable code as well as associated stored data, e.g., files used for the pre-provisioned device customization. The software code is executable by the general-purpose computer that functions as the activation server and/or that functions as a mobile device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for pre-provisioned device customization, in essentially the manner performed in the implementations discussed and illustrated herein.

Figure 6:
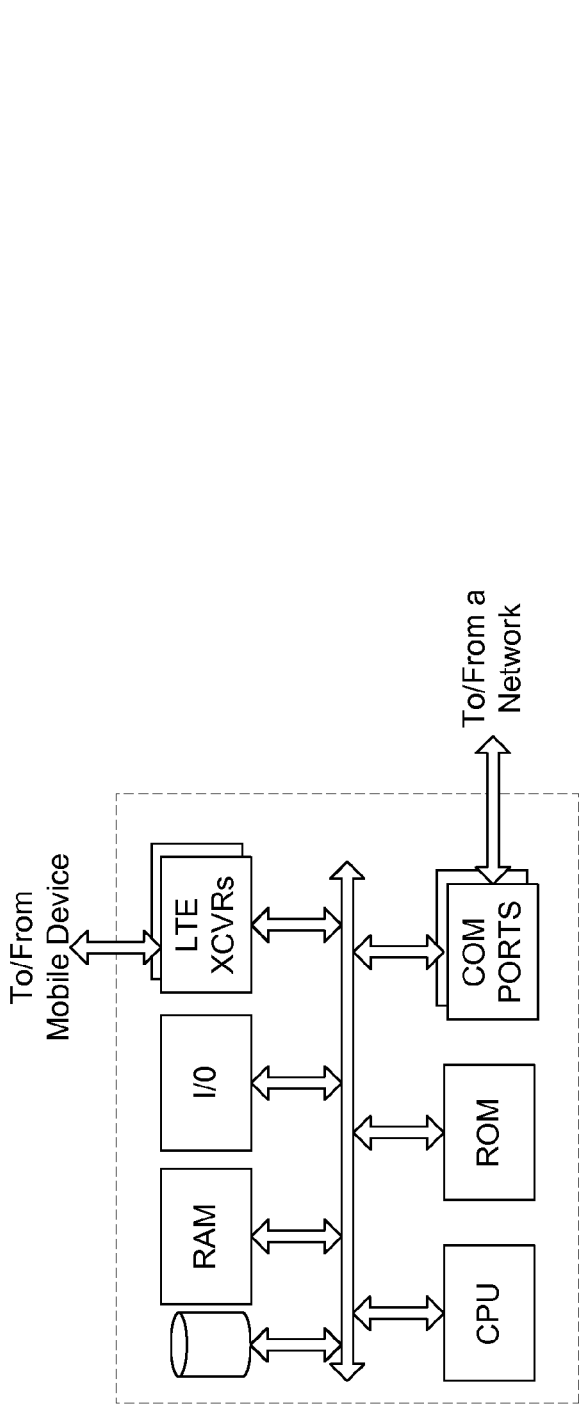
FIG. 6 is a simplified functional block diagram of a system that may be configured as a base device, for example, to function as an eNodeB in the system of FIG. 1.

FIG. 6 depicts a system with one or more wireless transceivers, as may be used to implement a wireless network node, such as eNodeB 112 in FIG. 1. A wireless network node, such as an evolved node B, also includes a data communication interface, CPU, main memory and storage for data and/or programming (see FIG. 6). In addition, such wireless network node includes one or more wireless transceivers in order to provide communications services to one or more mobile devices via various radio frequencies in compliance with one or more wireless communications standards (e.g., LTE). Although FIG. 6 depicts the system enclosed within a single structure, such physical structure is not required. Alternatively, or in addition, certain components may be located, either physically or logically, within disparate elements. For example, while the wireless network node includes the data communication interface and wireless transceiver(s), processing to control such communication interfaces may be implemented by a CPU and programming stored in a memory of another device, such as MME 52.

Figure 7:
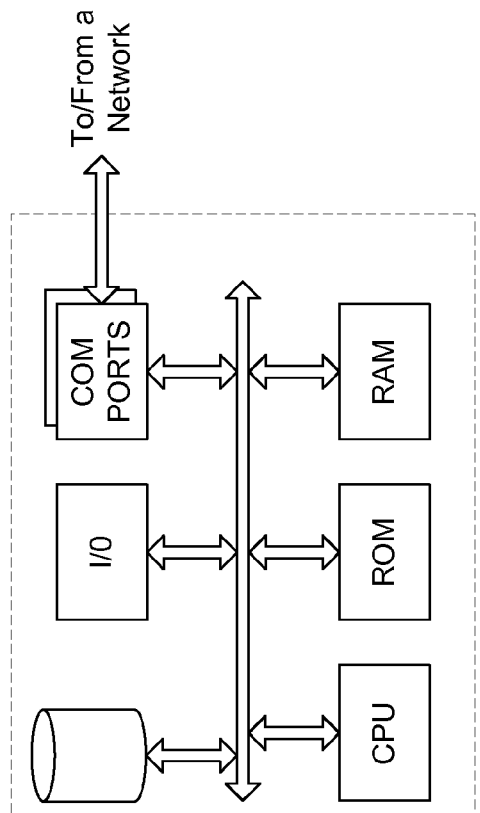
FIG. 7 is a simplified functional block diagram of a system that may be configured as a server, for example, to function as a mobile positioning server or a location server in the system of FIG. 1.

FIG. 7 provides a functional block diagram illustration of a general purpose computer hardware platform. More specifically, FIG. 7 illustrates a network or host computer platform, as may typically be used to implement a server, such as location server and/or any of the other servers/platforms implementing the sensory navigation confirmation service related functions shown in FIG. 1 or 2. A server, for example, includes a data communication interface for packet data communication (see FIG. 7). The server also includes processor hardware implementing a central processing unit (CPU), in the form of one or more processors, for executing program instructions. The server platform typically includes an internal communication bus, program storage, and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. The software programming relating to the VoLTE admission control techniques discussed herein may be downloaded and/or updated from a computer platform, for example, to configure the eNodeB or other server (e.g. FIG. 1 or 2) or from a host computer or the like communicating with the mobile device via the network (e.g. FIG. 1 or 2).

Hence, aspects of the methods of the sensory navigation confirmation service and applications outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile device manufacturer or cellular carriers into the computer platform of the respective cellular carriers that will be the activation or self-activation server or a third party server that provides the pre-provisioned device customization service for enabling pre-provisioned proprietary feature services and application under agreement with cellular carriers. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the examples of the pre-provisioned device customization, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A mobile device, comprising:
  a transceiver for wireless communication with cellular communication network components of a mobile communication network;
  a global positioning system (GPS) receiver;
  at least one memory to store information associated with a reference position location of the mobile device based on GPS signals received by the GPS receiver;
  one or more sensors to provide an output for determining a location of the mobile device relative to the reference position location; and
  a processor to:
    determine that the GPS receiver is unable to provide an update to the reference position location;
    process, based on determining that the GPS receiver is unable to provide the update, the output from the one or more sensors to determine successive relative locations of the mobile device relative to the reference position location;
    transmit, via the transceiver, a request for a network location assistance signal;
    receive, based on the request and at a first time, first predefined signals from two or more of the cellular communication network components,
      the first predefined signals being transmitted at a first specific time and by the two or more of the cellular communication network components;
    determine a first expected position of the mobile device based on a characteristic of the first predefined signals;
    receive, based on the request and at a second time, second predefined signals from the two or more of the cellular communication network components,
      the second predefined signals being transmitted at a second specific time and by the two or more of the cellular communication network components;

determine a second expected position of the mobile device based on a characteristic of the second predefined signals;
determine a directional vector using the first expected position of the mobile device and the second expected position of the mobile device,
the directional vector providing an approximate location of the mobile device between the first expected position and the second expected position, and
the directional vector providing a projected direction of travel of the mobile device between the first expected position and the second expected position;
identify a latest relative location of the mobile device from the successive relative locations of mobile device determined by the one or more sensors;
compare the latest relative location of the mobile device and the approximate location of the mobile device associated with the directional vector;
provide, based on comparing the latest relative location and the approximate location, information indicating a difference between the latest relative location and the approximate location provided by the directional vector; and
apply a correction coefficient to the latest relative location determined by the one or more sensors when the difference is outside a predetermined threshold,
a time period between identifying successive relative locations of the mobile device being extended when the difference falls within the predetermined threshold, and
the time period between identifying successive relative locations of the mobile device being shortened when the difference falls outside the predetermined threshold.

2. The mobile device of claim 1, wherein the processor is further to:
based on the difference being within the predetermined threshold, maintain the latest relative location for the mobile device.

3. The mobile device of claim 1, wherein the processor is further to:
based on the difference being outside the predetermined threshold, apply the correction coefficient to reduce the difference to be within the predetermined threshold.

4. The mobile device of claim 1, wherein the transceiver is one of a Wi-Fi transceiver or a Bluetooth transceiver.

5. The mobile device of claim 1, wherein each of the one or more sensors includes at least one of:
an inertial sensor,
an accelerometer,
a magnetometer,
a gyroscope, or
a barometer.

6. The mobile device of claim 1, wherein the processor is further to:
measure a receipt time of each of the first predefined signals from the two or more of the cellular communication network components;
determine a difference between the receipt time, of one of the first predefined signals, and the first specific time;
based on the difference between the receipt time, of one of the first predefined signals, and the first specific time, determine a distance of the mobile device from the two or more of the cellular communication network components; and
determine the first expected position of the mobile device based on a location of each of the two or more of the cellular communication network components and the distance.

7. A non-transitory computer-readable medium storing instructions, the instructions comprising:
one or more instructions that, when executed by one or more processors of a mobile device, cause the one or more processors to:
enable, via a transceiver of the mobile device, wireless communication with cellular communication network components of a mobile communication network;
store, in at least one memory of the mobile device, information associated with a reference position location of the mobile device based on global positioning system (GPS) signals received by a GPS receiver of the mobile device;
receive, from one or more sensors of the mobile device, an output for determining a location of the mobile device relative to the reference position location;
determine that the GPS receiver is unable to provide an update to the reference position location;
process, based on determining that the GPS receiver is unable to provide the update, the output from the one or more sensors to determine successive relative locations of the mobile device relative to the reference position location;
transmit, via the transceiver, a request for network location assistance signal;
receive, based on the request and at a first time, first predefined signals from two or more of the cellular communication network components,
the first predefined signals being transmitted at a first specific time and by the two or more of the cellular communication network components;
determine a first expected position of the mobile device based on a characteristic of the first predefined signals;
receive, based on the request and at a second time, second predefined signals from the two or more of the cellular communication network components,
the second predefined signals being transmitted at a second specific time and by the two or more of the cellular communication network components;
determine a second expected position of the mobile device based on a characteristic of the second predefined signals;
determine a directional vector based on the first expected position of the mobile device and the second expected position of the mobile device,
the directional vector providing an approximate location of the mobile device between the first expected position and the second expected position, and
the directional vector providing a projected direction of travel of the mobile device between the first expected position and the second expected position;
identify a latest relative location of the mobile device from the successive relative locations of mobile device;
compare the latest relative location of the mobile device and the approximate location of the mobile device provided by the directional vector;
provide, based on comparing the latest relative location and the approximate location, information indicating a difference between the latest relative location and the approximate location provided by the directional vector; and apply a correction coefficient to the latest relative location determined by the one or more sensors when the difference is outside a predetermined threshold, a time period between identifying successive relative locations of the mobile device being extended when the difference falls within the predetermined threshold, and the time period between identifying successive relative locations of the mobile device being shortened when the difference falls outside the predetermined threshold.

8. The non-transitory computer-readable medium of claim 7, wherein the one or more instructions, when executed by the one or more processors, further cause the one or more processors to:

based on the difference being within the predetermined threshold, maintain the latest relative location for the mobile device.

9. The non-transitory computer-readable medium of claim 7, wherein the one or more instructions, when executed by the one or more processors, further cause the one or more processors to:

based on the difference being outside the predetermined threshold, apply the correction coefficient to reduce the difference to be within the predetermined threshold.

10. The non-transitory computer-readable medium of claim 7, wherein the first predefined signals and the second predefined signals are provided according to at least one of:
a long term evolution positioning protocol,
a downlink position method,
an uplink position method support,
a cell identification,
an enhanced cell identification,
an enhanced observed time difference of arrival, or
an observed time difference of arrival.

11. The non-transitory computer-readable medium of claim 7, wherein each of the one or more sensors includes at least one of:
an inertial sensor,
an accelerometer,
a magnetometer,
a gyroscope, or
a barometer.

12. The non-transitory computer-readable medium of claim 7, wherein the one or more instructions, when executed by the one or more processors, further cause the one or more processors to:
present a user settings menu; and
based on a user selection of a setting from the user settings menu, adjust a reliability threshold level for the latest relative location of the mobile device.

13. The non-transitory computer-readable medium of claim 7, wherein the transceiver is one of a Wi-Fi transceiver or a Bluetooth transceiver.

14. The non-transitory computer-readable medium of claim 7, wherein the one or more instructions, when executed by the one or more processors, further cause the one or more processors to:
retrieve a prior GPS-based position fix from the at least one memory of the mobile device; and
use the prior GPS-based position fix as a reference point, when an initial relative location of mobile device is determined.

15. The non-transitory computer-readable medium of claim 14, wherein the one or more instructions, when executed by the one or more processors, further cause the one or more processors to:
use the initial relative location of the mobile device to determine a subsequent relative location of the mobile device.

16. A method, comprising:
enabling, via a transceiver of a mobile device, wireless communication with cellular communication network components of a mobile communication network;
storing, by the mobile device and in at least one memory, information associated with a reference position location of the mobile device based on global positioning system (GPS) signals received by a GPS receiver of the mobile device;
providing, by one or more sensors of the mobile device, an output for determining a location of the mobile device relative to the reference position location;
determining, by the mobile device, that the GPS receiver is unable to provide an update to the reference position location;
determining, by the mobile device and based on determining that the GPS receiver is unable to provide the update, the output from the one or more sensors to determine successive relative locations of the mobile device relative to reference position location;
transmitting, by the mobile device and via the transceiver, a request for network location assistance signal;
receiving, by the mobile device, based on the request, and at a first time, first predefined signals from two or more of the cellular communication network components,
the first predefined signals being transmitted at a first specific time and by the two or more of the cellular communication network components;
determining, by the mobile device, a first expected position of the mobile device based on a characteristic of the first predefined signals;
receiving, by the mobile device, based on the request, and at a second time, second predefined signals from the two or more of the cellular communication network components,
the second predefined signals being transmitted at a second specific time and by the two or more of the cellular communication network components;
determining, by the mobile device, a second expected position of the mobile device based on a characteristic of the second predefined signals;
determining, by the mobile device, a directional vector based on the first expected position of the mobile device and the second expected position of the mobile device,
the directional vector providing an approximate location of the mobile device between the first expected position and the second expected position, and
the directional vector providing a projected direction of travel of the mobile device between the first expected position and the second expected position;
identifying, by the mobile device, a latest relative location of the mobile device from the successive relative locations of mobile device determined by the one or more sensors;
comparing, by the mobile device, the latest relative location of the mobile device and the approximate location of the mobile device associated with the directional vector;

determining, by the mobile device and based on comparing the latest relative location and the approximate location, information indicating a difference between the latest relative location and the approximate location provided by the directional vector;

storing the information indicating the difference in the at least one memory of the mobile device; and applying, by the mobile device, a correction coefficient to the latest relative location determined by the one or more sensors when the difference is outside a predetermined threshold, a time period between identifying successive relative locations of the mobile device being extended when the difference falls within the predetermined threshold, and the time period between identifying successive relative locations of the mobile device being shortened when the difference falls outside the predetermined threshold.

17. The method of claim 16, further comprising:

comparing the difference to a threshold difference; and determining, when the difference is outside the threshold difference, a correction coefficient to be applied to one or more the sensors of the mobile device.

18. The method of claim 16, wherein the first predefined signals and the second predefined signals are provided according to at least one of:

a long term evolution positioning protocol,
    downlink position method,
    uplink position method support,
    cell identification,
    enhanced cell identification,
    enhanced observed time difference of arrival, or
    an observed time difference of arrival.

19. The method of claim 16, wherein each of the one or more sensors includes at least one of:

an inertial sensor,
    an accelerometer,
    a magnetometer,
    a gyroscope, or
    a barometer.

20. The method of claim 16, further comprising:

obtaining a prior global positioning system (GPS) location fix from the at least one memory of the mobile device; and using the prior GPS location fix as a reference point, when an initial relative location of mobile device is determined.

* * * * *